C. RIENER.
VEHICLE BRAKE.
APPLICATION FILED AUG. 30, 1913.
1,087,553.
Patented Feb. 17, 1914.
2 SHEETS—SHEET 2.
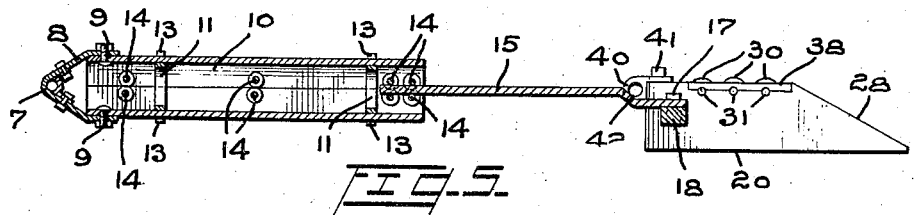
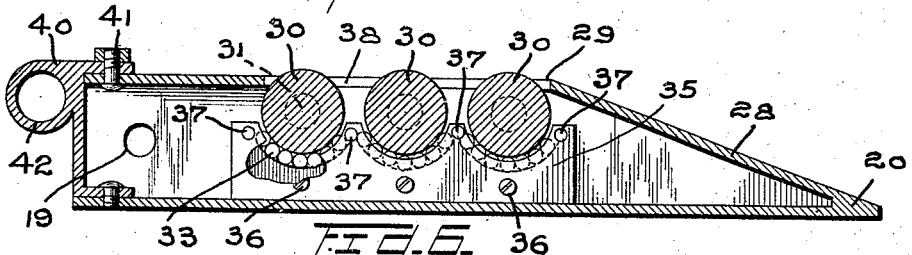
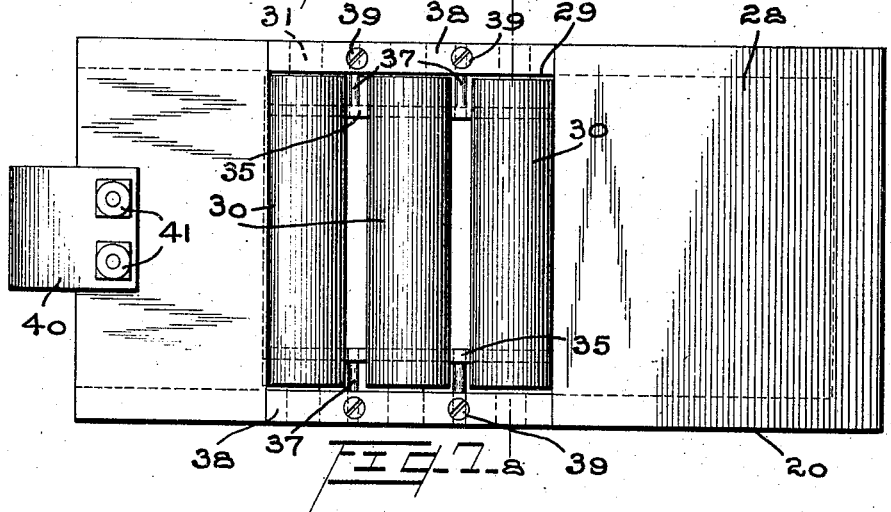
INVENTOR
Charles Riener
BY
Joshua R. H. Potts
ATTORNEY
WITNESSES:

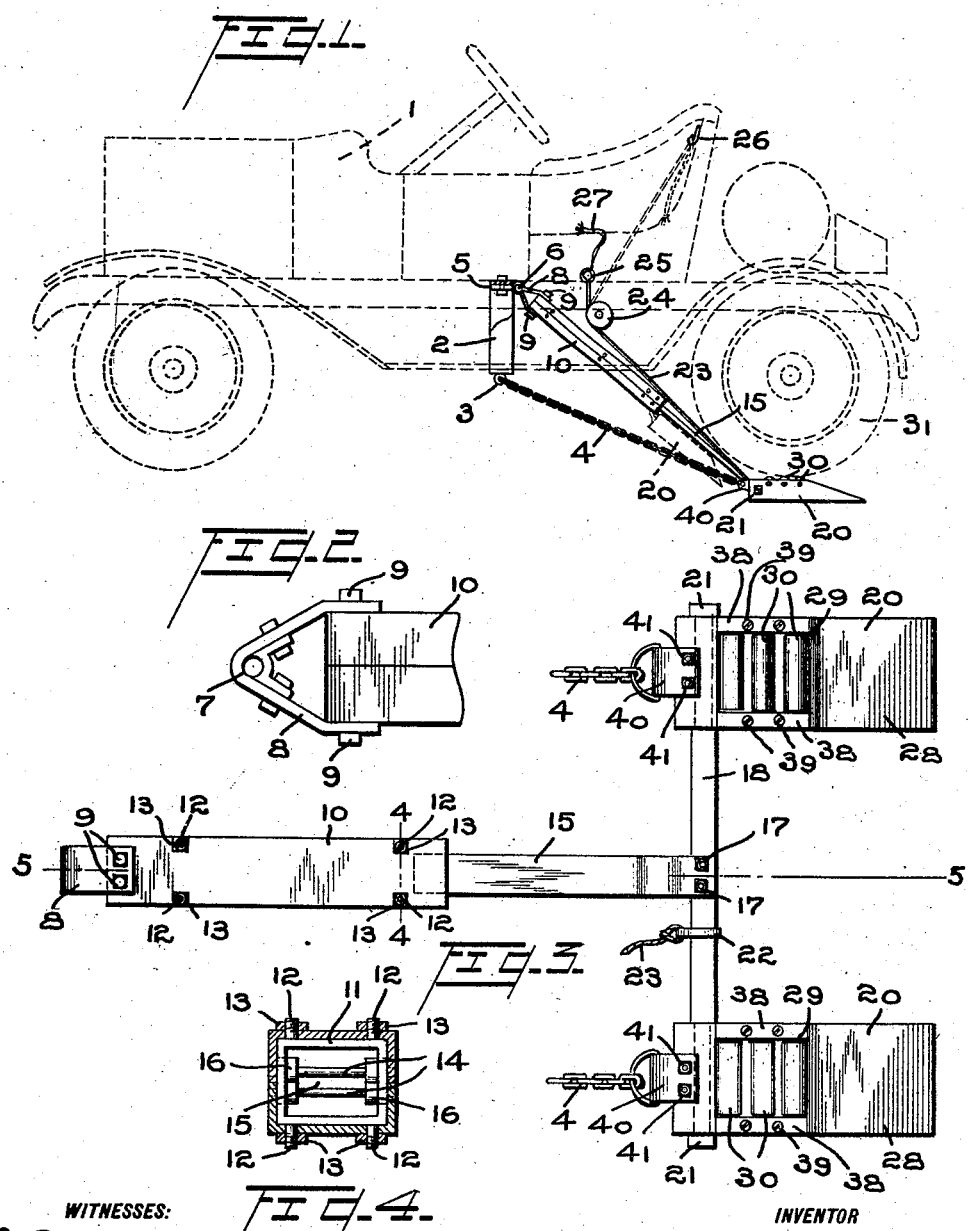

UNITED STATES PATENT OFFICE.

CHARLES RIENER, OF PHILADELPHIA, PENNSYLVANIA.

VEHICLE-BRAKE.

1,087,553.  Specification of Letters Patent.  Patented Feb. 17, 1914.

Application filed August 30, 1913. Serial No. 787,402.

*To all whom it may concern:*

Be it known that I, CHARLES RIENER, a citizen of the United States, residing at Philadelphia, in the county of Philadelphia and State of Pennsylvania, have invented certain new and useful Improvements in Vehicle-Brakes, of which the following is a specification.

My invention relates to improvements in vehicle brakes, and more particularly to brakes designed for use on automobiles, the object of the invention being to provide improved brake shoes and improved mounting therefor, which permits the brake shoes to be lowered and positioned on the ground, so that the wheels of the vehicle will revolve upon the brake shoes and be held out of contact with the ground, thus bringing the vehicle to a stop.

A further object is to provide improved means for holding the brake shoes in normal elevated position, and enabling them to be quickly dropped into operative position, so that the brake may be instantaneously brought into use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements attached to an automobile, the latter being shown in dotted lines. Fig. 2 is a view in side elevation on an enlarged scale illustrating the upper end of the casing 10 and showing its pivotally supporting strap. Fig. 3 is a plan view of the brake detached. Fig. 4 is a view in cross section on the line 4—4 of Fig. 3. Fig. 5 is a view in longitudinal section on the line 5—5 of Fig. 3. Fig. 6 is a view in longitudinal section on an enlarged scale through the center of one of the brake shoes showing a portion of the roller bearing confining plate broken away. Fig. 7 is a plan view of one of the brake shoes on the same scale as Fig. 6, and Fig. 8 is a view in section on the line 8—8 of Fig. 7.

1 represents an automobile of the ordinary type to the frame of which a transverse bar 2 is secured, and at its ends is bent downwardly and provided with eyes 3 for the attachment of chains 4 as will be hereinafter explained.

To the central portion of the bar 2, a plate 5 is bolted and at its bifurcated end is provided with a pin 6 which projects through an eye 7 formed at the free end of a strap 8. This strap 8 is connected by bolts 9 with the upper and lower faces of a longitudinal casing 10, and said strap operates to pivotally connect the upper forward end of said longitudinal casing to the automobile. The casing 10 comprises two channels which are secured together at intervals by rectangular frames 11 having threaded studs 12 thereon which project through the channels and have nuts 13 screwed upon said studs against the channels.

A plurality of pairs of rollers 14 are mounted in the casing and between these rollers a bar 15 is adapted to slide, the rollers 14 having enlarged ends 16 which prevent lateral movement of the bar 15, and the rear end of this bar 15 is secured by bolts 17 to a transverse rod 18. The rod 18 is angular throughout its intermediate portion, but at its ends is cylindrical and is projected through openings 19 in the forward ends of my improved brake shoes 20. The free ends of the rods 18 are screw-threaded for the reception of nuts 21 to secure the brake shoes on the rod. A link 22 is located on the rod 18 between its ends, and has a rope 23 secured thereto. A rope 23 is passed over a pulley 24 on the automobile frame, and is provided with an eye 25 which is adapted to be caught over a hook 26 on the automobile and support the brake shoes in their normal elevated position.

A flexible device 27 is connected to the eye 25 to facilitate the operation of the rope 23 in drawing the brake shoes to elevated position. Both brake shoes are precisely alike, and hence the description of one will apply alike to both.

Each brake shoe comprises a hollow casting having a beveled rear end 28, and the top of said casting is open as shown at 29. Through this opening 29, the upper surfaces of a plurality of rollers 30 project and upon these rollers 30, the rear wheels 31 of the automobile are adapted to revolve. The rollers 30 have trunnions 31 at their ends mounted in bearings 32 at the sides of the brake shoe, but these bearings 32 do not support the weight of the rollers 30, such weight being sustained by a series of roller bearings 33 supported on curved runways 34 integral with the casting of the brake shoe.

Removable plates 35 are secured to the inner wall of the casting by screws 36 and confine the roller bearings 34. Pins 37 are projected into the brake shoe at the ends of the runways 34 to prevent any possibility of the roller bearings being drawn outwardly by the rotary movement of rollers 30. Cap strips 38 are secured over the trunnions 32 by screws 39 and prevent any possibility of loss of the rollers 30.

At the forward ends of the brake shoes, brackets 40 are secured by bolts 41, and these brackets have eyes 42 to which the rear ends of the chains 4 above referred to are connected. The chains 4 limit the rearward movement of the brake shoes and sustain such strain as the wheels 31 revolve upon the brake shoes.

The rope 23 serves to raise and lower the brake shoes, and in so doing compels the bar 15 to move longitudinally in casing 10, such movement facilitated by the rollers 14.

In Fig. 1 the brake shoes are shown in operative position. That is, they have moved rearwardly and the rear wheels 31 have moved up the inclined ends 28 onto the rollers 30, and any further rotary movement of the wheels 31 will have no propelling effect upon the vehicle, so that the latter may be brought to a quick stop.

To release the brakes, a pull on the flexible device 27 will cause the rope 23 to draw the brake shoes forwardly and upwardly, the bar 15 telescoping in casing 10. The eye 25 is then caught over the hook 26, and the brake will be supported in the position shown in dotted lines in Fig. 1.

To apply the brakes, it is simply necessary to release the eye 25 from hook 26, when the brake shoes will fall by gravity into the operative position indicated.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a casing adapted at one end to be pivotally connected to a vehicle frame, rollers in said casing, a bar mounted to telescope in the casing and movable between the rollers, a transverse rod secured at its center to said bar, brake shoes supported at the ends of the rod and having beveled rear ends upon which the wheels of the vehicle are adapted to ride, means for moving the bar longitudinally in the casing, and means for limiting the rearward movement of the brake shoes, substantially as described.

2. The combination with a vehicle body, of a transverse bar secured to the body and the ends of said bars projected downwardly and provided with eyes, a casing pivotally connected to said transverse bar, a longitudinal bar telescoping in the casing, a transverse rod connected between its ends to the last-mentioned bar, brake shoes on the ends of said rod, means for moving the longitudinal bar in the casing, and flexible devices connecting said eyes with said brake shoe, substantially as described.

3. The combination with a strap adapted to be pivotally connected to a vehicle frame, a longitudinal casing secured to said strap and extending rearwardly therefrom, a bar mounted to telescope in said casing, a transverse rod secured at its center to said bar, brake shoes connected to the ends of said bars and having beveled rear ends upon which the wheels of the vehicle are adapted to ride, a flexible device connecting said rod with the vehicle and adapted to raise and lower the shoes, and other flexible devices connecting the shoes with the vehicle frame, substantially as described.

4. The combination with a strap adapted to be pivotally connected to a vehicle frame, a longitudinal casing secured to said strap and extending rearwardly therefrom, a bar mounted to telescope in said casing, a transverse rod secured at its center to said bar, brake shoes connected to the ends of said bars and having beveled rear ends upon which the wheels of the vehicle are adapted to ride, a flexible device connecting said rod with the vehicle and adapted to raise and lower the shoes, a transverse bar secured to the vehicle frame and having eyes thereon, and flexible devices connecting said eyes with the forward ends of the brake shoes, substantially as described.

In testimony whereof I have signed my name to this specification in the presence of two subscribing witnesses.

CHARLES RIENER.

Witnesses:
HARRY RIENER,
CHAS. E. POTTS.